United States Patent [19]

Von Voros

[11] 3,742,488
[45] June 26, 1973

[54] ELECTRO-OPTICAL DIGITAL POSITION INDICATOR

[75] Inventor: Geza Von Voros, Glen Rock, N.J.

[73] Assignee: Optogram, Inc., Oakland, N.J.

[22] Filed: Aug. 4, 1971

[21] Appl. No.: 168,969

[52] U.S. Cl. ............................................ 340/347 AD
[51] Int. Cl. .............................................. H03k 13/02
[58] Field of Search ................. 340/347 P, 347 AD; 235/151.32

[56] References Cited
UNITED STATES PATENTS

| | | | |
|---|---|---|---|
| 3,526,890 | 9/1970 | Malina | 340/347 AD |
| 3,271,564 | 9/1966 | Rosenfeld | 340/347 P |
| 3,262,105 | 7/1966 | Bell | 340/347 P |
| 3,588,886 | 6/1971 | Lee | 340/347 P |

*Primary Examiner*—Maynard R. Wilbur
*Assistant Examiner*—Jeremiah Glassman
*Attorney*—Ralph R. Roberts

[57] ABSTRACT

This invention pertains to an electro-optical digital position indicator wherein in a preferred embodiment a tape is carried by a machine tool worktable and as mounted thereto is passed to and around a precision gage roller which carries a radially arranged grating disc or member. As the roller is driven this disc is rotated and cuts a ray of light provided by a light source. This ray interruption is read by a photosensor and is converted into electrical pulse signals fed to a digital counter and readout. The tape is a thin metal tape maintained at a determined tension so that the gage roller is capable of converting linear into rotary motion with high precision and accuracy. The tape is preferably of a metal having a coefficient of thermal expansion which is substantially that of the machine tool to which it is mounted. A constant tension spring is provided to preset or establish the tape at a determined tension after which the tape is locked. The metal tape then expands and contracts at the same rate as the table upon which it is carried. In a second embodiment the tape is carried and is moved by the worktable so that the tape rotates the precision roller at twice the rate of travel of the worktable. In this embodiment the rotational movement of the radially arranged grating disc is at twice the revolutions per unit length of linear motion than is the like disc carried by a like gage roller in the first embodiment thus permitting a more accurate reading of the table movement to be made. In yet another embodiment, a precision lead screw which is preferably of rather short length is carried in precision bearings mounted in supports carried by and in precise alignment with the movement of the worktable. A precision nut such as a ball nut is in engagement with this precision lead screw and is carried in a support fixed to the machine tool. As thus arranged the lead screw is moved with and is caused to be rotated in response to the movement of the worktable. A rotary grating disc carried on the end of the lead screw feeds electrical pulse signals in the same manner as does the encoder provided for in the tape driven indicators mentioned above. In a similar embodiment, the precision lead screw is finally secured in supports carried by the table of the machine screw while the precision nut is rotatably carried in a support fixed to the base or non-moving bed of the machine tool. The nut carries or drives the interrupter grating disc which, as it rotates as above, cuts a beam of light resulting in electrical pulse signals being fed to the readout. The rotation of the precision nut converts linear motion into electrical pulse signals as in the other embodiments mentioned above.

29 Claims, 22 Drawing Figures

Patented June 26, 1973

Fig_1A

Fig_1B

Fig_1D

Fig_1C

PRIOR ART

Fig_1

Fig_2

INVENTOR.
GEZA VON VOROS
BY
Ralph R. Roberts

INVENTOR.
GEZA VON VOROS
BY
Ralph R Roberts
AGENT.

ELECTRO-OPTICAL DIGITAL POSITION INDICATOR

BACKGROUND OF THE INVENTION

1. Field of the Invention

With respect to the classification of art as established in the United States Patent Office the art to which this invention pertains is found in the general class of "Geometrical Instruments" and more particularly in the subclass of "distance measuring" and even more particularly in the subclass of "tape" and the further subclass of "computing." Pertinent art may also be found in the subclass of "rolling contact" and "rolling contact computing." Further reference may be made to the general subclass of "digital computers" as found in the general class of "registers." In the class of "Radiant Energy," art of note may be found in the subclass for an optical system where a "light valve 'is' actuated by physical quantity" or is actuated by a "light chopper" or by a "rotary device."

2. Description of the Prior Art

Many linear measuring systems have been proposed, tested and are used so as to provide a digital readout for the precise positioning or linear measurement of the movement of a worktable of a machine tool. In many of the known systems the reading of a precise scale, for example a glass scale, gives only the position of the table in relation to an origin point. Such systems require computation to be made by the operator for incremental movements. There are also linear scales with gratings for incremental and absolute motion indication. Also in use are systems employing measuring rods in the nature of gage blocks and the like. In jig bore machine tools, accurate linear readings usually utilize the lead screw as a measuring means as it is rotated; however, point-to-point movement requires computation on the part of the operator. The present invention provides a linear measurement of determined accuracy as does the other above-noted linear measuring devices. In this system a rotary optical encoder is electrically coupled with a digital readout capable of being reset at the point of start so that a precise measurement of any incremental movement of the worktable is read on the digital readout.

Rack and pinion systems driving rotary encoders are known as well as tape systems using tape pulled around a precision pulley. In another instance the rotary movement of a precise roller over the face of a machine tool worktable is computed. However, insofar as is known, these systems tend to develop both random and/or cumulative errors from dirt, gear tooth errors, linear expansion or contraction because of the change in temperatures, or because of wear or slippage causing the apparatus to lose its precision even if the accuracy was initially there. In particular, a tape system in which the tape is stored in a spring-loaded spool and is fed from the spool is known; however, such a device is temperature sensitive due to the spring loading and the thermal expansion and contraction of the tape. Measuring the travel of the worktable by rolling a precision roller across the face of the worktable is also used as a means for measuring the linear travel of a worktable. This system depends upon the accuracy of the roller and of the worktable face against which the roller is engaged and requires precise alignment. Furthermore, dirt or grease accumulation on the face of the worktable or on the face of the precision roller will upset the reading and accuracy.

In the present invention the electro-optical digital position indicator utilizes a metal tape whose length is closely related to the worktable of the machine tool. Each position indicator system is disposed to read one axis after mounting in position on the machine tool. The tape in its mounted condition is brought under a determined tension then is locked in this condition. The tape is maintained at this tension in a fixed relation to the machine tool as the worktable is moved to perform determined operations. The tape and the rest of the unit is maintained in a sealed enclosure and is maintained in a non-contaminated condition so that the accuracy initially built into the apparatus is maintained throughout its use and operation. In this manner the present invention provides an accurate linear digital readout which maintains its accuracy while being sealed. This system accommodates itself to variations in temperature as encountered by machine tool installations and operating conditions.

SUMMARY OF THE INVENTION

This invention may be summarized at least in part with reference to its objects. It is an object of this invention to provide, and it does provide, an electro-optical digital position indicator wherein a metal tape set at a predetermined tension is carried by and is moved by the linear travel of a worktable. The tape as it is moved with and by the worktable drives a precision gage roller which carries a radially arranged grating member which interrupts a light beam to cause a photosensor to provide means to feed these interruptions as electrical pulses to a digital readout.

It is a further object of this invention to provide, and it does provide, an electro-optical digital position indicator wherein a metal tape, set at a predetermined tension, is carried by a pair of rollers so as to be moved by the linear travel of the worktable at twice the rate of travel of the worktable.

It is a further object of this invention to provide, and it does provide, an electro-optical digital position indicator wherein a precision lead screw having a large lead or pitch is carried by a pair of fixed bearings mounted on the worktable of the machine tool. A ball nut is carried by a support fixed to the base or bed of the machine tool and engages the lead screw so as to cause the lead screw to rotate as the screw is moved by the worktable. A radially arranged grating disc or member carried by the rotating screw is adapted to interrupt a light beam to cause a photosensor or a multiple arrangement of them to feed the resulting signals as electrical impulses to a digital counter and readout.

It is a still further object of this invention to provide, and it does provide, an electro-optical digital position indicator wherein a precision lead screw is fixedly secured in supports carried by the worktable of the machine screw, while a precision nut is rotatably carried in a support fixed to the bed of the machine tool and is rotated as the screw is moved by the worktable. The nut carries or drives an interrupter grating disc which as it is rotated interrupts a light beam to cause a photosensor or a multiple arrangement of them to feed the resulting signals as electrical pulses to a digital counter and readout.

The electro-optical digital position indicator, in accordance with the above objects, is shown in four embodiments. Each of these embodiments is disposed to provide a precise readout of one coordinate of movement. Usually the indicator is mounted on a machine tool such as a boring or milling machine where point-to-point distances must be computed and accurately measured. Accordingly, the position indicator is mounted on a worktable with a portion of the indicator mounted on the fixed base, bed or column of the machine tool.

In one embodiment the indicator includes a thin metal tape which is carried in a trough member fixedly attached to the movable worktable. The tape is fixedly attached at one end and at the other end is attached to a constant-tension spring-loaded support. After the tape has been set or established at the determined tension it is clamped at this set tension during operation of the digital position indicator. A precision diameter gage roller carried by the base of the machine tool engages and is driven by the tape as the worktable is moved. The precision diameter gage roller has its axle arranged to carry a grated or interrupter disc having radial lines disposed to interrupt a light beam directed at a photosensor which feeds these interruptions as electrical pulses to a digital readout.

In a second embodiment, the thin metal tape is carried in a trough member attached to the movable worktable. Both ends of the tape are attached to a housing carrying the transducer, said housing being secured to the base of the machine tool. The tape is stretched between two rollers carried by supports which are secured to the worktable. One roller is fixed and the other roller is carried by a bracket attached to a constant tension spring-loaded support which may be locked in position by a solenoid or screw. A precision diameter gage roller is carried by the transducer housing to which the ends of the tape are attached. As the worktable is moved this precision roller is rotated at twice the travel rate of the worktable. The axle of the precision diameter gage roller is arranged to carry a radial grating or interrupter disc having lines radially disposed to interrupt a light beam directed at a photosensor which translates these interruptions as pulses to a digital counter and readout.

In a third embodiment the indicator includes a precision lead screw which screw is carried in precision bearings mounted in brackets secured to the worktable. A ball nut carried by and in a bracket fastened to the base or bed of the machine tool is mounted on the lead screw so that as the worktable is moved the lead screw is caused to rotate. A precision grating disc having radial lines is carried on the end of the lead screw and is disposed to interrupt a light beam directed at photosensors which feed these interruptions as pulse signals to a digital counter and readout.

In a fourth embodiment which is similar to the third embodiment above, the indicator also includes a precision lead screw which is fixedly carried in brackets mounted on the worktable. A ball nut rotatably carried by and in a bracket fastened to the base or bed or the machine tool is mounted on the lead screw so that as the worktable is moved the ball nut is caused to rotate. A precision grating or interrupter disc is carried by or is driven by the ball nut and as it is rotated interrupts a light beam directed at photosensors which feed these interruptions as pulse signals to a digital counter and readout.

In addition to the above summary the following disclosure is detailed to insure adequacy and aid in understanding of the invention. This disclosure, however, is not intended to prejudice that purpose of a patent which is to cover each new inventive concept therein no matter how it may later be disguised by variations in form or additions of further improvements. For this reason there has been chosen a specific embodiment of the electro-optical digital position indicator as adopted for use on a machine tool inspection apparatus, layout machines and the like and showing a preferred means for measuring the travel of the worktable. This specific embodiment and alternate embodiments thereof have been chosen for the purposes of illustration and description as shown in the accompanying drawings wherein:

BRIEF DESCRIPTION OF THE DRAWINGS

FIG. 1 represents a diagrammatic illustration of four prior art methods providing for a digital positioning readout of machine tool worktables and the like. In this grouping of illustrated prior art:

DESCRIPTION OF THE PRIOR ART AS SHOWN IN FIG. 1

As depicted in FIG. 1 precision linear measuring systems for use on machine tools and other positioning or gaging devices are known and those using a rotary encoder have taken many forms of which the most prevalent are indicated in FIG. 1 which on the drawing has been labeled prior art.

Figure 1A:
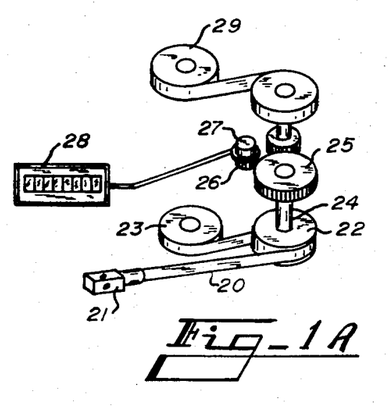
FIG. 1A represents a tape and wheel assembly wherein the tape is played out or drawn in by a spring, the tape driving a roller and rotary encoder.

In FIG. 1A is represented a system employing a tape 20 wherein the tape is fixed at one end 21 to the worktable of the machine tool. This tape is fed to and around a precision roller 22 and then to a tape supply 23 which tape supply is maintained by a constant tension spring so that the tape is retained more or less at a determined tension as it is played in and out from the supply reel 23. Shaft 24 carrying the precision roller 22 utilizes a gear 25 to drive a pinion 26 which rotates an encoder sensing head 27 to feed signals to a readout counter 28. Constant tension spring 29 is also connected to gear 25 so as to impart a desired tension to the tape. This system is at present being sold under the trade name "ANILAM Linear Tape Digital Readout System" by the Anilam Electronics Corporation of 25 West 21st St., Hialeah, Fla., 33010. This linear measuring system provides no compensation for temperature changes which occur and cause minute rotation of the rotary encoder due to the expansion of the tape 20.

Figure 1B:
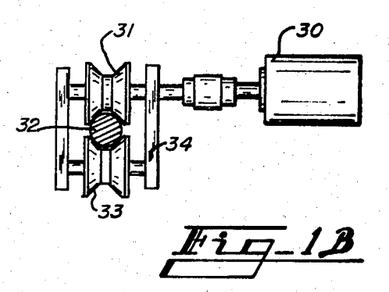
FIG. 1B represents a roller in engagement with and being driven by a shaft as either the roller or the shaft is moved relative to the other, the roller driving a rotary encoder to feed signals to a readout.

In FIGS. 1B there is depicted a system in which a shaft encoder 30 driven by a roller 31 is rotated by the linear movement of a precision bar 32. This bar 32 is maintained in a determined engagement with roller 31 by means of a support roller 33 which may be of a like size. Rollers 31 and 33 are shown as being carried by a bracket 34. The relative motion of bracket 34 with bar 32 causes roller 31 to be rotated to drive the rotary encoder 30 whose output is fed to an electronic readout counter such as the readout counter 28 shown in FIG. 1A. Precision bar or shaft 32 may be moved with and by the worktable in which case the bracket 34 is retained in a fixed condition on the base or bed of the machine tool. In an alternate arrangement, the relative motion may be provided by having shaft 32 carried by brackets mounted on the machine tool base whereupon bracket 34 is carried by the worktable which is movable. In this mode the roller 31 travels along the fixed bar or shaft. No matter the mode, the system of FIG. 1B has only point contacts between roller 31 and bar or shaft 32. This system is subject to slippage at higher accelerations and the effective radius of roller 31 will vary with wear. Furthermore, the accuracy in the reading of the linear movement depends on shaft diameter, roller accuracy, temperature stability and alignment and is particularly difficult to obtain when the desired accuracy is such as one ten-thousandths of an inch.

Figure 1C:
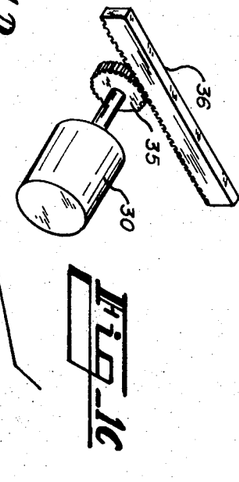
FIG. 1C represents a rack and pinion arranged so that as one of these members is moved relative to the other a rotary encoder driven with the pinion is disposed to feed pulses to an electrical readout.

In FIG. 1C is depicted a shaft encoder 30 driven by a pinion 35 which is in engagement with a rack 36. The rack 36 may be mounted on the machine tool worktable which is movable. In this mode the pinion 35 and the encoder 30 are carried in a fixed condition on the machine tool and the movement of rack 36 causes rotation of pinion 35 to occur. In an opposite mode the rack 36 is mounted in a fixed condition upon the machine tool and the encoder 30 and pinion 35 are mounted on and are movable with the worktable to cause the movement of the worktable to be "read" by the encoder and fed to a digital readout counter such as the readout 28 shown in FIG. 1A. The accuracy of "reading" the linear movement by a system using this particular embodiment is not generally satisfactory because of the inaccuracies which naturally occur in cutting the tooth form of the rack and of the pinion and also the meshing of the teeth of the pinion 35 and the rack 36.

Figure 1D:
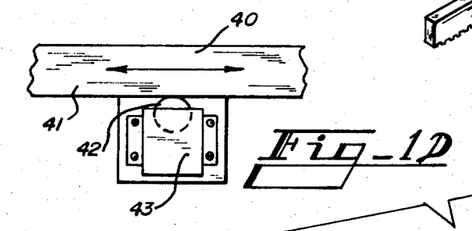
FIG. 1D represents a linear measuring system in which a roller is brought into a determined engagement with the face of a worktable of a machine tool and as the worktable is moved a rotary encoder driven with the roller feeds signals to a readout counter.

In the embodiment depicted in FIG. 1D a worktable 40 of a machine tool is moved in the manner conventional with this machine tool. The face 41 of the worktable is assumed to be relatively straight and smooth. Against this face a roller 42 is pressed so as to be rotated by the movement of the worktable as it is moved back and forth. The rotation of the roller 42 is read by a rotary encoder carried in the housing 43. The output of the encoder is then fed to a digital readout such as readout 28 seen in FIG. 1A. Such a system is at present being made and distributed by CERIC CORPORATION of 1195 East Arques Ave., Sunnyvale, Calif. 94086. The possibility of dirt or chips being accumulated on the face 41 or roller 42 presents one of the problems. The time consuming and almost impossible alignment problems of the plane of the roller and the table path require a compensating means to maintain such a linear measuring system at a degree of reasonable accuracy.

Figure 2:
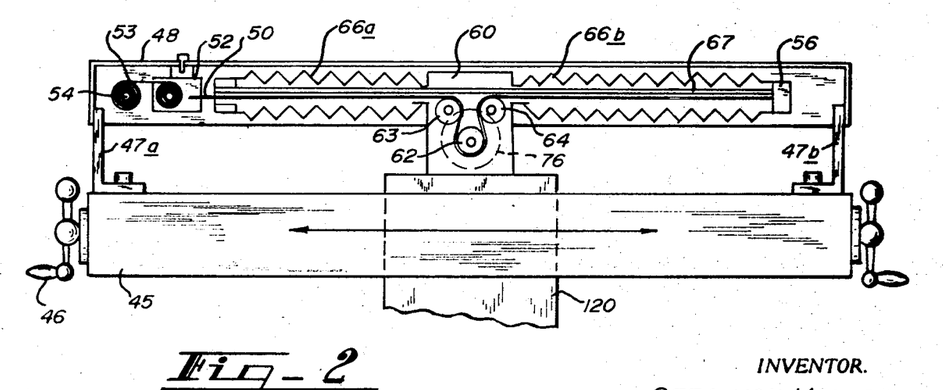
FIG. 2 represents a partly diagrammatic plan view of an embodiment of this invention wherein a tape driven optical encoder is mounted in a fixed relationship to the base and worktable of a machine tool and the tape is carried by and is moved with the worktable to provide a precise linear movement and drive of a precision gage roller and a connected optical rotary encoder.

Description of the Tape Driven Linear Measuring System of FIG. 2

In FIG. 2 is shown a plan view of a preferred embodiment of the electro-optical digital position readout indicator of this invention. This indicator is mounted on a worktable 45 which is movable back and forth by a lead screw rotated by means of handles 46 manipulated in the conventional manner. Mounted to a side or face of this worktable are brackets 47a and 47b which carry a housing or trough 48 within which is mounted the tape driven measuring system. A tape 50 is diagrammatically represented and has its left end retained by a block 52 which is connected by a constant tension spring 53 to a fixed shaft or pin 54 carried by housing 48. The block 52 is locked during operation of the linear measuring system. The other end of the tape 50 is fixedly carried by a support block 56 which is retained in the right-haNd end of the housing 48 mounted on bracket 47b. In a fixed housing called the transducer housing or support 60 is carried a tape driven precision gage roller 62. The tape 50 is retained in a guided position around more than half of the circumference of this precision roller by means of two idler rollers 63 and 64 which will be more fully described hereinbelow in conjunction with FIGS. 4 and 5.

The housing or support 60 is provided with retaining collars upon which is mounted the inner ends of bellows 66a and 66b. The outer ends of these bellows are attached to tape retaining guides provided on blocks 52 and 56 and to be hereinafter more fully described. These bellows are provided so as to prevent the accumulation of grease, dirt and the like on the tape or on the rollers. It is also desired by using these bellows to restrict the entrance of moisture to the tape compartment and change the surface characteristics of the rollers and tape. Such an accumulation or change, of course, would defeat the high precision desired to be provided in this linear measuring system. A support bar 67 is also carried by blocks 52 and 56 and is positioned adjacent to the tape so that the bellows 66a and 66b as they are expanded and contracted will not accidentally engage the tape 50.

Figure 3:
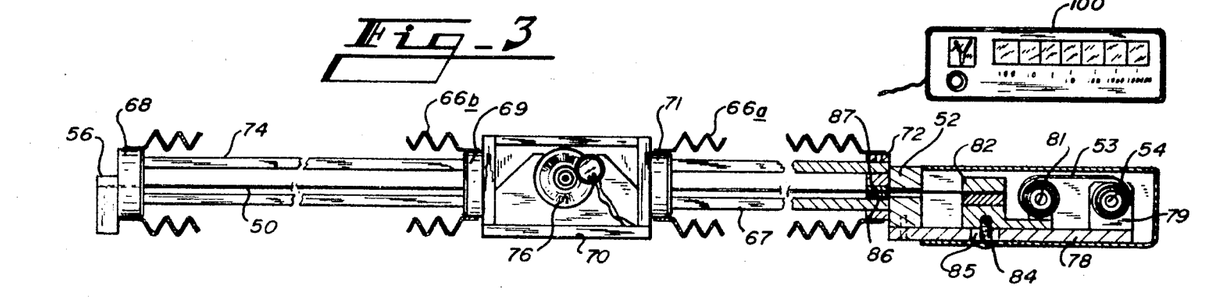
FIG. 3 represents, in a slightly enlarged scale, the apparatus of FIG. 2 with a portion of the linear measuring system shown in section and showing the arrangement and details of certain components in more complete detail.

Referring next to FIG. 3 it is to be noted that shown herein the fixed end for retaining tape 50 by a fixed block 56 is at the left of the fixture. This occurs since the system for this view has been turned one hundred eighty degrees from the arrangement of FIG. 2. As more fully seen in FIG. 3 the fixed support block or bracket 56 is formed with a round end portion 68 which is sized to snugly receive and retain the outer or left end of bellows 66b. A like round receiving end portion 69 is provided on the left side of housing 70 forming an enclosing portion of the fixed housing 60 when attached to the base of the worktable. A like round receiving end portion 71 is provided on the right-hand side of housing 70 as seen in FIG. 3. This receiving end portion 71 is disposed to engage and retain the inner end of bellows 66a while a round end 72 which is formed on or attached to the block or bracket 52 provides a support and attaching means for the outer or right end of bellows 66a.

Support bar 67 has its left end fastened and supported in round end 68 and its other end supported and retained in round end 72. Clearance holes are provided in retainers 69 and 71 so that support bar 67 can extend through and move through housing 70. As seen in this particular embodiment, it may be desirable to provide a second protecting support bar 74 which also extends between ends 68 and 72. This bar is disposed on the opposite side of the tape 50 from the bar 67 so as to provide and insure that the bellows 66a and 66b are retained in an aligned condition and do not touch the tape 50 as they (the bellows) expand and contract.

It is to be further noted that in FIG. 3 the precision or gage roller 62 carries on its upper end a radial grating member 76 which is rotated with roller 62 as the tape 50 is moved by and with worktable 45. This tape on its one end is carried in block support 52 which is mounted upon a support plate 78. This plate also carries on its other end the fixed shaft 54 which extends from a bracket 79 fastened to plate 78. Shaft 54 retains one end of the constant tension spring 53 while the other end of this constant tension spring is carried on a shaft 81 which is mounted upon a slidable bracket 82 also supported by plate 78. Bracket 82 is formed with a threaded hole adapted to receive the threaded shank of a cap screw 84 which is slidable in a slot 85 formed in the support plate 78. The right end of tape 50 is retained in bracket 82 by insertion into a slot formed in said bracket 82 and is clamped in this slot by means of a screw or screws not shown. To maintain the interior portion enclosed by the bellows and housing 70 in a dust free condition, plastic or rubber guides 86 and 87 are provided in round end 72 so as to wipe and guide the tape 50 in a desired and prescribed manner. These guides are fitted into end 72 so as to prevent dust from entering the bellow system through the passageway for the movable tape. In a like manner the left end of tape 50 is fastened in end 56 wherein it passes through guides and a wiper system provided in block 68. This guide and wiper system is like the system in block 52. Support bar 74 may be omitted from this system; however, in a very long linear measuring system it is usually desirable to provide this bar to insure that the bellows do not accidentally engage the tape 50.

When the tape 50 has been fastened in fixed end 56 and block 82 the determined desired tension in the tape is developed in tape 50 by spring 53. When the linear measuring system is to be used the block 82 is clamped to support plate 78 by means of cap screw 84.

Figure 4:
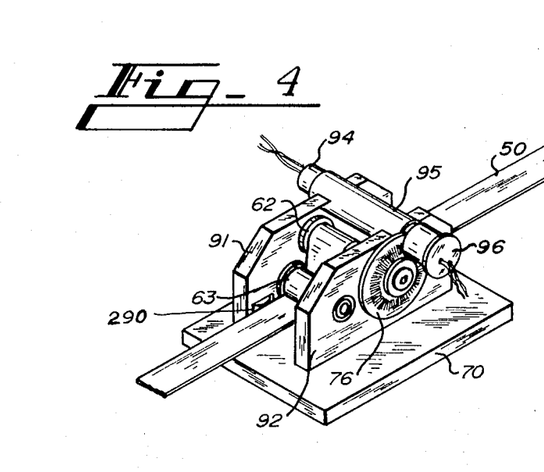
FIG. 4 represents in a more enlarged scale an isometric view of the housing in which is carried the rollers of the tape drive and showing the related positioning of the calibrated roller and idler rollers used in the transducer and an optical encoder for reading the rotation of the calibrated roller.
Figure 5:
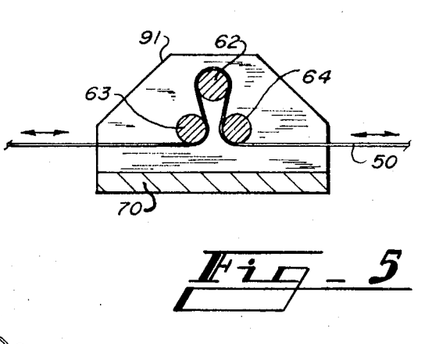
FIG. 5 represents a plan view showing in section the two idler rollers and the tape driven calibrated precision roller as mounted in the optical encoder or transducer housing of FIG. 4.
Figure 6:
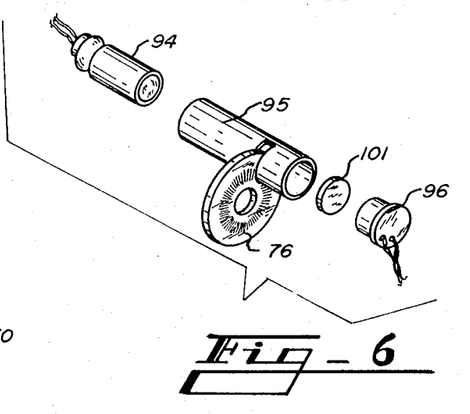
FIG. 6 represents in a partly exploded isometric view the arrangement of the optical encoder wherein a ray of light from a light source is fed through a lens system via a radially grated disc and a slit disc to a photoelectric sensor arrangement which translates interruptions of the ray of light as electrical pulse signals to indicate the amount and direction of the rotational movement of the precision roller of FIG. 4.

Referring next to FIGS. 4 and 5, it is to be noted that housing 70 includes two side plates 91 and 92 in which idler rollers 63 and 64 are freely rotatably mounted. These rollers are parallel and are precisely aligned with plate 70 so as to provide a guide plane for the tape 50. From rollers 63 and 64 the tape 50 is fed to and around the precision roller 62 also called the gage roller. In one example, as reduced to practice, this roller is a precise determined diameter which is slightly less than one inch in circumference. The diameter of this gage roller is determined by the thickness of the tape 50. In use it is contemplated that the exact mid-thickness of the tape as it passes around the roller 62 will transcribe an arc whose circumference is exactly one inch. As the tape 50 is contemplated to be of metal such as an alloy of steel and having a thickness of two-thousandths of an inch the diameter of a precision roller 62 for such a tape thickness is calculated to be 0.31631 inches or thirty-one thousand six hundred thirty-one hundred-thousandths of an inch in diameter. Carried on the near shaft end of roller 62 is the radial grating member 76 which is a plastic or glass disc upon which, as reduced to practice, is printed or engraved a predetermined number of precisely spaced radially disposed lines or openings. Discs of metal with etched lines or with through holes may be provided if desired. The lines radially which may be 500, 1,000, 1,250 or other number of pairs per revolution provide the actuation means for the optical pulse code sensing of this system. This actuation is provided by means of a light source 94 whose light rays are directed through a tube or shield 95 to an array of photosensor means 96. The grating member 76 as it is rotated with the revolving of the precision roller 62 causes a pulsation in the light signal being read or received by the photosensor means 96. These pulses are delivered to a digital readout 100 as seen in FIG. 3. As particularly shown in FIG. 6 a masking or fixed grating means 101 is provided in the end of tube 95 and in alignment with the photosensors 96 so as to provide ninety degree phase shifted light pulses developed by the rotation of the radial grating member 76. For the purpose of identification and claiming the grating member 76 is called the interrupter disc and the fixed grating means 101 is called the slit disc.

Figure 7:
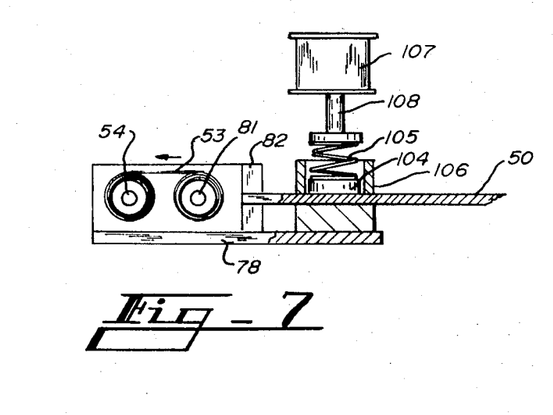
FIG. 7 represents a side view showing in a somewhat diagrammatic manner a fragmentary portion partly in section of the means for retaining an end of the tape and maintaining a determined tension on the tape by a constant tension spring arrangement and also the means for clamping the tape by a plunger actuated by a solenoid.

Tape Clamping Means of FIG. 7

Referring next to FIG. 7 there is shown an alternate means for clamping the tape 50 after it has been tensioned by the constant tension spring 53. Spring 53 is carried on axles 54 and 81 and as in FIG. 3 is disposed to pull or urge slidable bracket 82 leftwardly upon support plate 78. Tape 50, shown in greatly enlarged detail, is fastened to bracket 82 and rightward thereof passes over and rests upon a block or base 103. On the other side of the tape and opposite the clock 103 is pressure pad 104 engaged and urged by a spring 105 toward the tape and block. Pressure pad 104 is slidably retained by and within walls 106 and by means of solenoid 107 and its plunger 108 acts as a clamp when the system is placed into operation. When the electrical portion of the measuring system is turned on the solenoid plunger 108 moves toward the tape 50 to clamp the tape against the block by means of pad 104. An override or defeat switch may be provided to release the clamping action on the tape when actuated by the operator. In normal use, the tape 50 is maintained at a determined tension by means of spring 53 and is clamped against block 103 so that the tape 50 is at a fixed length and determined tension during the operation of the measuring system.

Figures 8, 9:
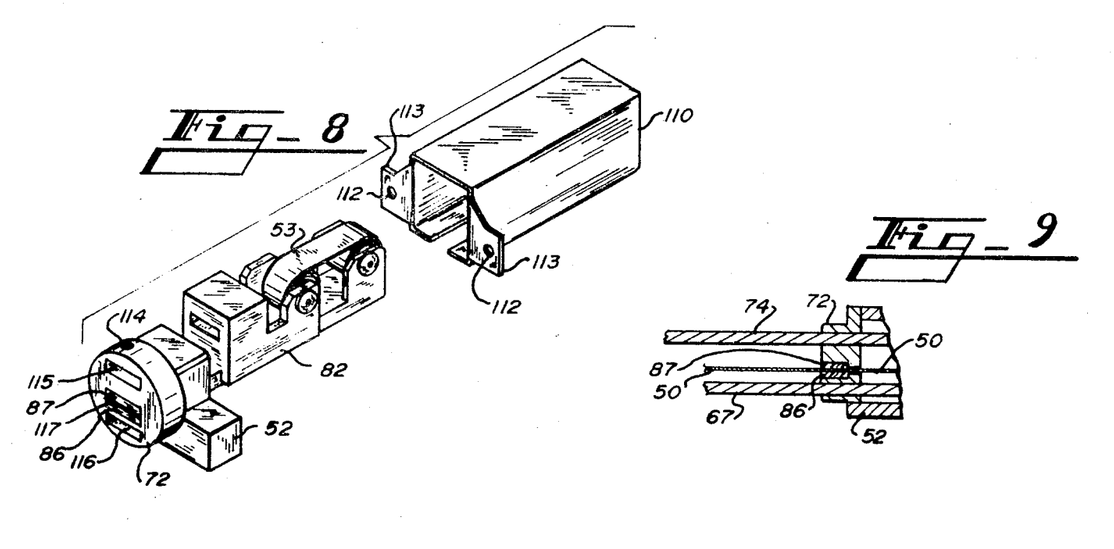
FIG. 8 represents an exploded isometric view showing the relative arrangement of the components providing the constant tension spring actuation of the tape.
FIG. 9 represents a fragmentary sectional view showing the tape as it is slidably retained in a guide in a support bracket.

Constant Spring Arrangement of FIG. 8

Referring next to FIG. 8 there is shown the arrangement of the constant tension spring assembly whereby after assembly of the unit a sheet metal housing or guard 110 is fastened to block 52 by means of cap screws not shown. These screws pass through holes 112 provided in flange portions 113 of the housing 110. It is to be noted that a set screw 114 is carried in a tapped hole in round end 72 and is disposed to enter into a slot 115 adapted to receive the end of the support bar 74. In a like manner slot 116 is adapted to receive the end of support bar 67 and by means of a set screw, not shown, clamp the bar in the slot. Pressed into slot 117 are the wipers 87 and 86 which are adapted to wipe the tape 50 as it is moved back and forth by spring 53. As seen in an enlarged detail in FIG. 9 the wipers 86 and 87 are seated in a shouldered recess formed in end 72 to prevent their linear displacement and in mounted condition they lightly engage the tape 50 as it passes through and into the slot provided in bracket 82 for the fastening therein. The bracket 82 is clamped to fix or set the tension in the tape 50 when the linear measuring system is to be used.

Operation of the Unit of FIGS. 2 through 9

The electro-optical digital position readout indicator of this invention as seen in FIG. 2 includes the fixed housing 60 which includes the assembled housing 70 which when assembled is a dust and light proof housing. This housing is mounted to a fixed portion of base 120 of a machine tool so that the two idler rollers 63 and 64 are in a parallel alignment with the face and the lineal travel of the worktable 45. The tape 50 is next mounted in position after brackets 47a and 47b have been attached to the worktable 45. The fixed support block 56 is mounted in position and the tape is fed from this fixed block to the idler roller 64 then around the roller 62 then to and around idler roller 63. The tape is then led to and through the guide provided by the wipers 86 and 87 and into block 82 where it is clamped into position. As seen in FIG. 3 at the time of clamping the tape, the spring 53 is expanded to its maximum forward or leftward condition. After the tape has been fastened in block 82 the spring 53 is released so as to pull the tape into the desired tension. Screw 84 is tightened when the lineal measuring system is to be operated. The radially grating member 76 (interrupter disc) is mounted upon the upwardly extending shaft portion of the precision roller 62 after which the light responsive system comprising light source 94, tube 95 and photosensor 96 as masked by slit disc 101 is mounted in position. The output of the photoelectric sensor is connected to the digital readout 100 and by means of a conventional circuit causes the desired pulse signals to be shaped, their phase relation detected and numerically displayed via an up-down counter by readout 100.

In FIGS. 2 and 3 it is to be noted that the tape 50 is fastened at each end, one end in block 56 and the other end in slidable bracket 82 and in between is wound around the precision roller 62. It is further noted that this roller is contemplated as making one revolution for one inch of travel of the tape 50. In this embodiment the tape reading roller 62 is fixedly carried by the bed 120 of the machine tool. The tape is set at a determined tension by means of the constant tension spring 53 and is clamped at the time of operation. Linear expansion and contraction of the machine tool worktable is anticipated as being substantially the same as that for the tape 50 since the tape is made out of an alloy of steel whose thermal coefficient of expansion is substantially the same as that of the machine tool worktable. Whether the screw 84 of FIG. 3 is used to lock the tape at the desired tension or whether the alternate clamp system of FIG. 7 is used the tape 50 is tensioned and clamped at both ends during linear measurement by the system.

Figures 10, 11, 12:
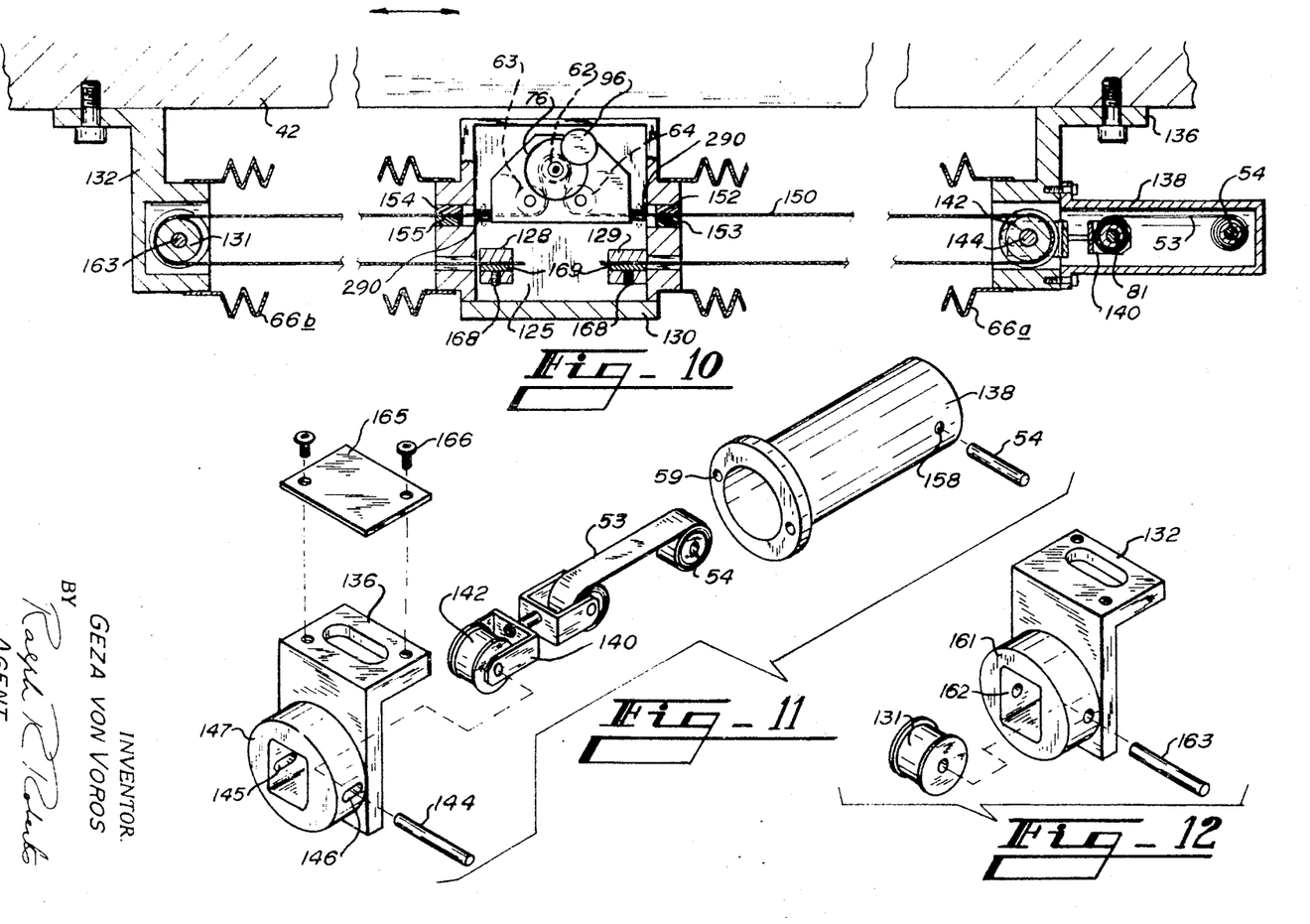
FIG. 10 represents an enlarged plan view, partly in section, and showing the general arrangement of the optical encoder indicator of FIG. 2 and particularly a preferred method of mounting an alternate tape drive wherein the tape is moved at twice the rate of travel of the worktable.
FIG. 11 represents an exploded isometric view of one of the tape retaining ends of the indicator measuring system of FIG. 10 in which a constant tension spring is provided to urge the tape retaining roller to a desired tension of the tape before clamping in position.
FIG. 12 represents an exploded isometric view of the tape retaining roller support for the other end of the tape of the measuring system of FIG. 10 in which the tape retaining roller is rotatably mounted in a fixed bracket.

Alternate Embodiment of FIGS. 10, 11 and 12

Referring next to FIGS. 10, 11 and 12 there is shown an alternate embodiment of the apparatus to that shown in FIG. 3. In this alternate embodiment, instead of the tape having its ends retained in and by brackets carried by the worktable, the ends of the tape are retained in the fixed member housing which in this embodiment is identified as housing 125. This housing also known as the transducer housing is attached to the fixed base or bed of the machine tool and carries the roller assembly as seen and described in conjunction with FIG. 4. As depicted, rollers 63 and 64 and precision roller 62 guide and carry and are rotated by a tape 150. As roller 62 is rotated the interrupter disc 76 is actuated in the manner as described in conjunction with FIG. 3. The ends of the tape 150 are fastened to stanchions or blocks 128 and 129 carried in housing member 125. An outer cover 130 is removably attached to one side of housing 125 which preferably makes the interior of the housing nearly air tight as well as light tight. Bellows 66a and 66b like the bellows shown in and described in relation to FIG. 3 are disposed to enclose and protect the tape 150 from dirt, moisture and grease. The free ends of the tape 150 before being fastened in stanchions 128 and 129 are arranged so that one end of the tape is brought to and around roller 131 which is freely rotatably retained in block or bracket 132 fastened to the worktable 42 as in FIG. 3 above-described. A bracket 136 carries housing 138 in which a constant tension spring 53 has one end carried on shaft or post 54 with the other end of the spring carried on shaft or post 81 carried by and on a slide bracket 140. The left end of slide bracket 140 extends through and into a recess in the bracket 136 where a roller 142, like roller 131, is freely rotatably carried on a shaft 144. This shaft is slidable back and forth within defined limits as determined by expansion and contraction of the constant tension spring 53. Clamp or screw means, not shown, are disposed to lock slide bracket 140 in a determined "set" position after the tape has been tensioned by spring 53 and before the worktable is moved and the linear measuring system is put into operation.

As seen in FIG. 11 the pin 144 is maintained in a determined alignment with the worktable by slots 145 and 146 provided in the round end portion 146 of the support bracket 136. The roller 142 is adapted to freely rotate on axle 144 as the tape 150 is fed around it. Also carried in housing 125 are wipers 152 and 153 disposed in a right-hand slot formed in the right end wall of the housing. This slot accommodates the tape 150 and the wipers 152 and 153 mounted therein. A like pair of wipers 154 and 155 is carried in a left-hand slot formed in the left end wall of the housing 125. This slot accommodates the tape 150 and wipers 154 and 155 as the tape is fed into and through the housing 125. Housing or cover 138 is provided with drilled holes 158 in which is mounted the shaft or axle 54 which carried the right end of the constant tension spring 53. The other end of the housing 138 is flanged and is provided with holes 159 through which screws (not shown) position and fasten the housing 138 to the bracket piece 136.

Referring now particularly to FIG. 12 it is to be noted that bracket 132 provides the support for roller 131 and is formed with a rounded end portion 161 in which is formed cavity 162 and within which roller 131 is carried and is rotatably retained therein by means of an axle or shaft 163.

Use and Operation of the Linear Measuring Apparatus Shown in FIGS. 10 through 12

In the system and apparatus as shown in FIGS. 10 through 12 the transducer housing 125 carries the pair of tape guide idler rollers 63 and 64 as well as the precision gage roller 62 in the manner of FIG. 3. Mounted on an upwardly extending shaft end of roller 62 as above-described is the interrupter disc 76 whose rotation is "read" by the electro-optical system so that photosensor arrangement 96 may feed electrical signals as pulses to the digital readout 100 in the manner above-described. In this embodiment the tape 150 is mounted so that its ends are retained in stanchions 128 and 129 which are part of or are attached to housing 125. The tape 150, as shown, is fed around the roller 62 and idler rollers 63 and 64 to and around rollers 131 and 142 carried in brackets 132 and 136 with the ends of the tape fastened in the stanchions 128 and 129 by means of set screws 168 which engage pressure pads 169.

After threading of the tape 150 around the rollers has been accomplished the tension spring 53 is stretched to provide a selected amount of tension so that the tape 150 is drawn to a predetermined tension. After this tensioning is accomplished the slide bracket 140 is clamped to set the tension during operation of the measuring system. The movable portion of the tape is guided through the wipers 152, 153, 154 and 155 provided in the appropriate openings in the housing 125. The interior of the apparatus may be purged to the extent of passing dry air or an inert gas through the system after which covers 165 may be placed in position on brackets 132 and 136 and fastened thereto by screws 166 to assure that no dust or dirt enters the system. A cover or guard, not shown, is attached to the worktable 42 to move with the worktable 42 to protect the system from accidental mechanical damage. As seen, the worktable as it is moved to the left and right causes the tape 150 to be moved. The resulting movement of tape 150 around roller 62 is at precisely twice the rate of motion of the worktable 42. This result occurs because as the worktable moves it carries both lengths of tape while the ends of the tape are fixed in housing 125. The accuracy of the interrupter disc if maintained provides twice as many pulses for one increment of travel as does the system of FIG. 2. This enables the operation of the system of FIG. 10 to provide an increased accuracy for the same unit of travel of worktable 42.

Figures 13, 14, 17:
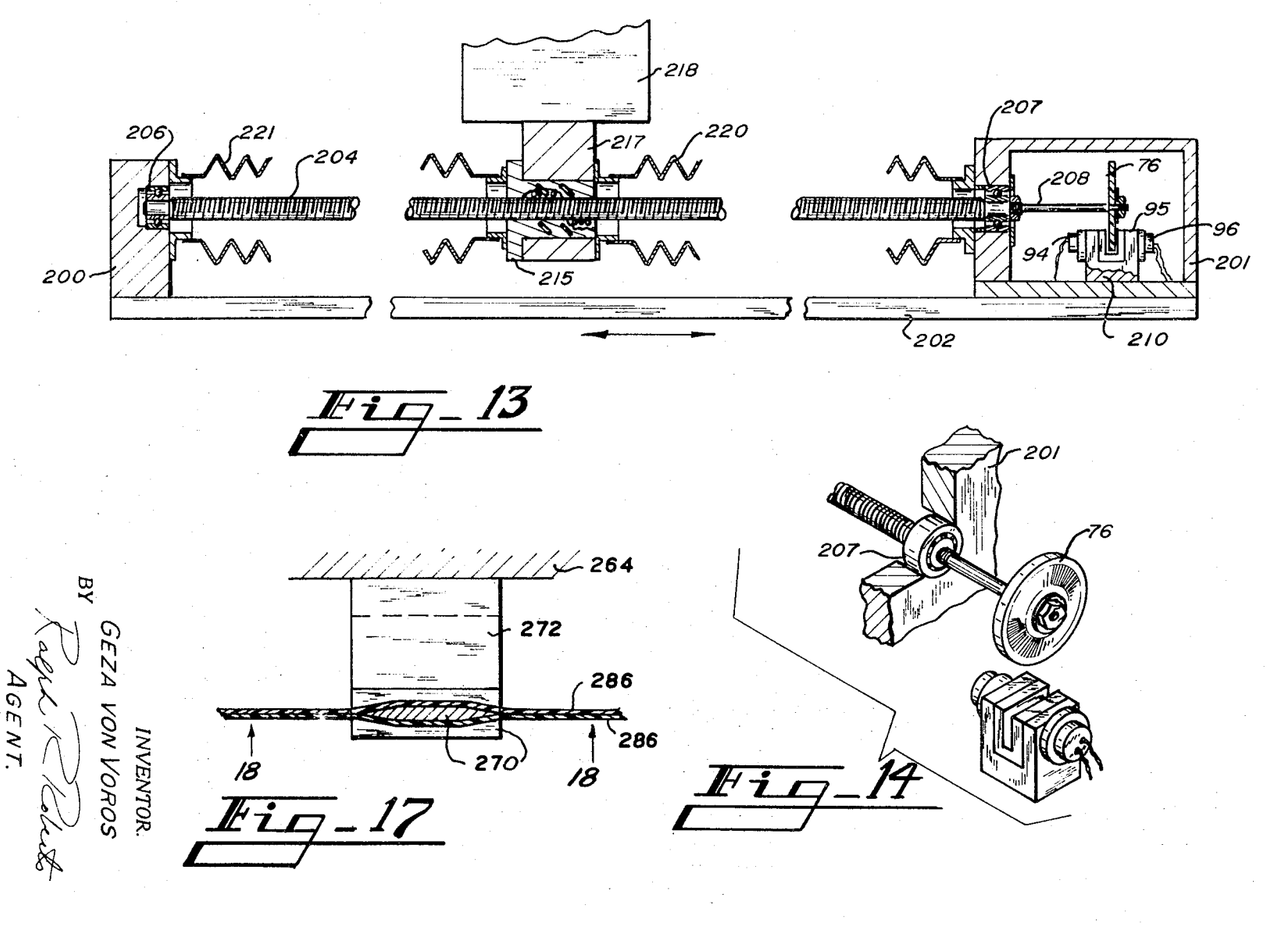
FIG. 13 represents a plan view, partly in section, of an alternate linear measuring system in which a precision lead screw having a high pitch or lead is rotatably driven by a ball nut carried in a fixed portion of the machine tool.
FIG. 14 represents an exploded isometric view of the end of the lead screw shown in FIG. 13 said lead screw mounted in a bearing with an optical encoder carried on a shaft portion so as to measure the rotation of said screw.
FIG. 17 represents a plan view, partly diagrammatic and in section, in which is particularly shown a preferred contour of the bracket stem, the view taken on the line 17—17 of FIG. 16 and looking in the direction of the arrows.

Linear Measuring Device as Seen in FIGS. 13 and 14

Referring next to FIGS. 13 and 14 there is shown a measuring device wherein a fast pitch lead screw is used instead of a tape 50. In this embodiment support members 200 and 201 are attached to worktable 202 so that a precision lead screw 204 is held precisely parallel and axially aligned to the travel of the worktable. This lead screw 204 is contemplated as having a fast pitch or lead, for example, a pitch of about four threads per inch may be generally provided. More or less threads per inch may be used but practicality of manufacture and wear of the screw must be considered. It is further contemplated that the screw be of a short length such as twelve or so inches. This short length is contemplated to be mounted on the worktable so as to measure the in-and-out transverse movement of the worktable whereas the apparatus of FIG. 3 or FIG. 10 is usually provided for measuring the longitudinal movement of the worktable. Lead screw 204 is carried in precision bearings 206 and 207 and, as formed, has one end of the screw reduced in diameter to provide a shaft 208 upon which is mounted the interrupter disc 76 which is the radial grating member as described above and as seen in FIGS. 6 and 14. The outer portion of the disc 76 passes through tube guide 95 so that rays of light from source 94 is fed to a photosensor arrangement and is interrupted by the lines on the disc 76 as it is rotated and the resulting electrical pulses are fed to the digital readout 100 in the manner of FIG. 3. A bracket 210 is adapted to carry the light source 94, tube 95 and photosensor 96 so that the interrupter disc 76 may freely rotate in the slot formed in tube 95. Mounted on the intermediate portion of the lead screw 204 and in engagement therewith is a ball nut 215 which is fixedly mounted in bracket 217 carried by a fixed portion of the base or bed of the machine tool 218. Bellows 220 and 221 are provided to enclose the screw and apparatus to keep dirt, moisture and dust from getting on the screw and affecting the accuracy of the screw and nut.

Use and Operation of the Apparatus of FIGS. 13 and 14

The use of a lead screw system is suggested only for those machine tool applications wherein the length of measurement is short as, for example, 12 inches. The accuracy of a lead screw of a greater length is very difficult to achieve and/or maintain and as the length of the screw increases becomes progressively more expensive. However, in the contemplated shorter lengths, a lead screw can provide an inexpensive measuring system having an acceptable degree of accuracy. For this reason, where space limitations are present and the in-and-out movement of the worktable requires a comparatively short measurement, the measurement may be best accomplished by means of the apparatus of FIGS. 13 and 14. In use the lead screw 204 is carried by brackets 200 and 201 fastened on the movable portion of the worktable. Ball nut 215 is carried in a bracket or housing 217 which is attached to a fixed portion 218 of the machine tool. As the worktable is moved back and forth, as indicated by the arrows, the lead screw is moved therewith. The nut 215 is maintained in a fixed orientation and condition, therefore as lead screw 204 is moved the nut engages the screw to cause the screw to turn in the nut. As the screw is rotated, it in turn rotates disc 76 with the light from source 94 being cut and generating electrical pulses as the lines on disc 76 are moved in front of the photosensor 96. These pulses are fed and computed by the digital readout 100 as a determined measured distance.

Figure 15:
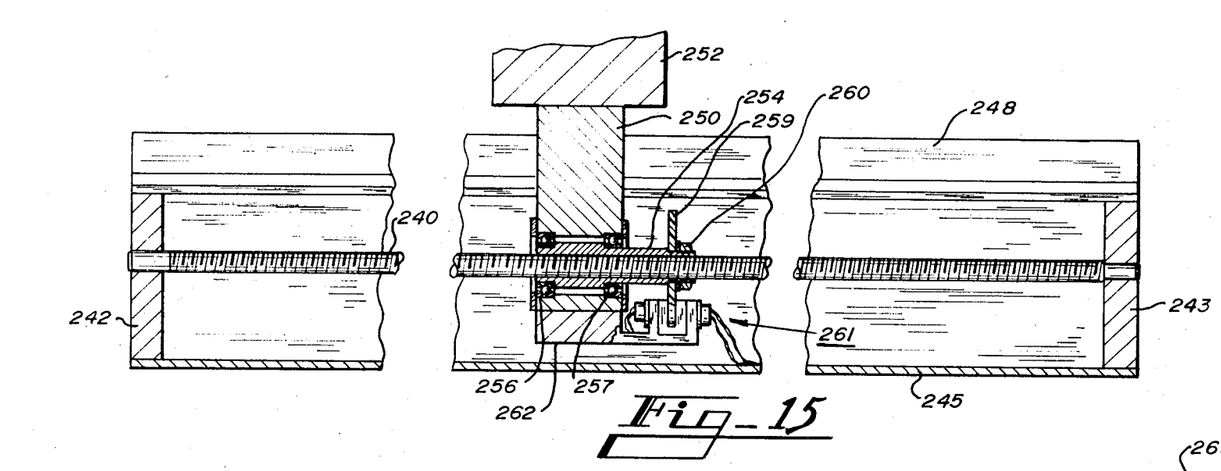
FIG. 15 represents a plan view of a linear measuring system like that of FIG. 13 but with the lead screw fixed in brackets fastened to the worktable and with the ball nut rotatably carried in a bracket secured to the base of the machine tool.

Alternate Embodiment of FIG. 15

Referring next to the embodiment of FIG. 15 there is shown an alternate arrangement to the lead screw embodiment of FIGS. 13 and 14. In this alternate arrangement lead screw 240 is fixedly mounted in end members 242 and 243 by screws or pins not shown. These end members as well as housing 245 extending therebetween are fixed to worktable 248 so as to be moved with the worktable. A bracket 250 is secured to bed or base 252 of the machine tool so as to be fixedly retained in relation to the immovable portion of the machine tool. A nut 254 which may be a ball nut or a precision threaded nut is mounted on the lead screw 240 while being rotatably positioned and retained in bracket 250 by ball bearings 256 and 257 retained in shouldered recesses in said bracket.

A rightwardly extending portion of nut 254 has mounted thereon an interrupter disc 259 which is retained by nut 260 on a shouldered seat formed on the right end of nut 254. The interrupter disc 259 has radially arranged lines disposed to cut a ray of light in the manner of FIG. 6 above-described. A photosensor assembly 261 which provides the light ray and the photosensor is carried on a support arm 262 attached to bracket 250 so as to be retained in a fixed condition and relation to disc 259 as the disc is rotated. The sealing of the housing 245 and the screw and nut, instead of by bellows, may be in the manner which is shown and described in conjunction with FIGS. 16, 17 and 18 hereinbelow.

Use and Operation of the Embodiment of FIG. 15

Lead screw 240 and cooperative nut 254 are preferably used to measure lengths up to twelve inches as in the embodiment of FIG. 13 above. This arrangement provides for screw 240 to be fixed in a non-rotating condition while the nut 254 is rotated with the longitudinal movement of the worktable 248 and the retained screw 240. Bearings 256 and 257 are preferably at least somewhat preloaded so as to prevent any longitudinal movement of the nut 254 as the worktable 248 and retained screw 240 are moved back and forth on base 252. An enclosure for the nut 254 and photosensor assembly 261 and disc 259 is normally provided but for the purposes of simplicity of illustration has been omitted from this showing.

Figure 16:
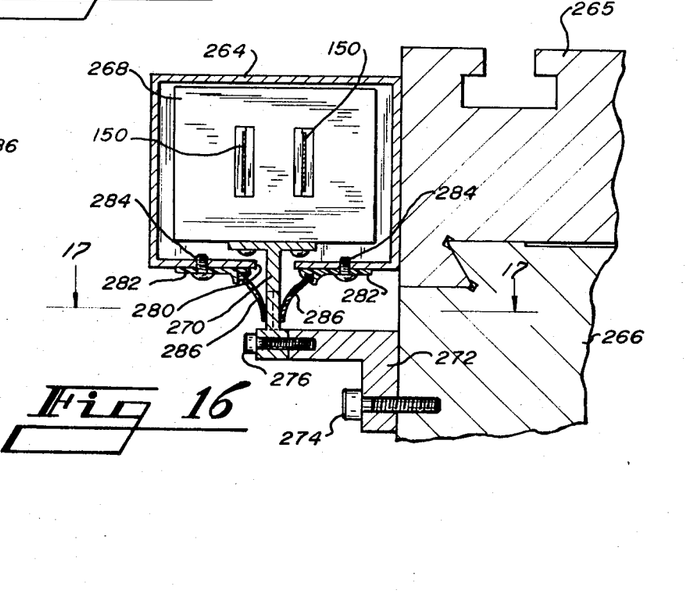
FIG. 16 represents a sectional view showing the tape driven position indicator of FIG. 10 wherein the transducer housing is carried on a support bracket secured to the base of the machine tool and with a stem portion of the bracket contoured to separate and slide between urged-together opposed rubber strips.
Figure 18:
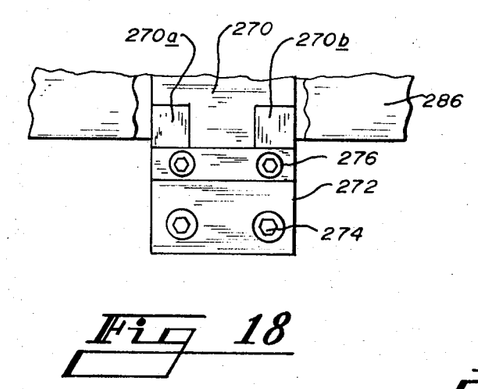
FIG. 18 represents a side view, partly diagrammatic, and showing the contoured stem portion of the bracket, the view taken on the line 18—18 of FIG. 17 and looking in the direction of the arrows.

Alternate Housing of FIGS. 16–18

Referring finally to FIGS. 16, 17 and 18 there is shown an alternate means for sealing the housing while permitting a fixed support member to extend into the housing. In this embodiment a longitudinal housing 264 is fixedly attached to a worktable 265 which is movably carried in guideways formed on base or bed 266 of the machine tool. Transducer housing 268, as in the case of the tape arrangement of FIG. 10, may retain the ends of tape 150 and also provide a guide and wiper for the extended movable length of the tape 150. A support bracket 270 is fastened by screws or rivets 271 to the underside of the transducer housing and retains this housing 268 in a fixed relationship to the base 266 by means of support clip 272 which is secured to the face of base 266 by means of cap screws 274 mounted in threaded holes in base 266. A pair of cap screws 276 passes through clearance holes in bracket 270 and is tightened in tapped holes provided in clip 272 so as to retain support bracket 270 in a determined relationship on clip 272.

A slot 280 is formed in the underside of housing 264 and extends substantially the length of said housing or for at least the determined length of travel anticipated to be "read" by the digital position indicator. Two like extrusions 282 which may be of rigid plastic or metal are fastened by screws 284 and are spaced at a determined distance from the slot 280. These extrusions are adapted to receive and retain plastic or rubber seal strips 286 which are bent from their formed plane so as to tightly meet at an apex. As seen in FIG. 17 these seal strips provide a dust right seal while permitting the stem portion of support bracket 270 to displace them sufficiently so as to pass therebetween. As seen in FIGS. 17 and 18 the stem portion of bracket 270 is tapered towards its ends so as to provide a smooth wedging action to part the edges of the strips 286. The tapered portions 270a and 270b are shown as planes and are contemplated as being symmetrical or substantially symmetrical around the longitudinal plane of bracket 270. At the apex of the planes 270a and 270b providing the tapered end portions the edge is slightly blunted so that there is no cutting or scraping of the strips 286 as the bracket is moved between the strips 286. As reduced to practice, strips 286 are of flexible vinyl which cause little drag on bracket 270 as it passes between the lower edges of the strips 286. The tapered portion of the stem of bracket 270 is contoured as much as possible to conform to the configuration developed by the strips 286 as they are displaced from their closed sealing condition. A suitable end closure, not shown, is provided at each end of the slot 280 and strips 286 so as to close, as much as psssible, the opening between the strips 286.

Use and Operation of Seal of

FIGS. 16 - 18

The seal provided by the assembly of FIGS. 16-18 is simpler to install and use than the seal provided by the bellows in FIGS. 2, 3, 10 and 13. In the type systems of FIGS. 2, 3 and 10 it permits the elimination of the support bars provided so as to protect the tape from the bellows. This seal, although not as completely effective as a total seal as is the bellows system, has proved to be quite satisfactory when used with a transducer housing in which the rollers are quite effectively sealed. The seal system of FIGS. 16-18 may be used with either tape or lead screw linear digital position indicator and in addition to being less expensive to fabricate and install permits interior inspection of the housing 260 by removal of screws 284. As the tapered portion of bracket 270 passes along the apex of the strips 286 they are locally displaced as seen in FIG. 17 and as this tapered portion passes the residual bias in the strips urges them again into sealing condition.

In the several systems above-described it is contemplated that a protective cover will be provided. This cover is usually attached to or is a troughlike member which encloses the linear measuring system and protects the several components from damage from the accidental dropping of the tools, workpieces or clamp fixtures. As modifications to accommodate the several machine tools may be required specific details for a cover member have been omitted from the drawings and description. It is to be noted that the bellows shown for the purpose of providing a dust tight seal may be eliminated and in combination with the cover a slit seal means be provided. Dry pressurized air or gas may also be used to purge and maintain the system free of dirt, grease and/or moisture.

The tape which is shown and described is of a relative thinness which will permit it to be bent into an arc around a roller about five-sixteenths of an inch in diameter. Of course, thicker or thinner tapes may be used and the width of the tape is merely a matter of selection. Whether the tape is of metal, alloys of metal or of plastic is a matter of selection depending on the operational use. Certain reinforced plastic and fiber glass films have excellent low-stretching characteristics and where the coefficient of expansion is comparative to the worktable to which it is to be attached may be used.

In the above-described measuring systems employing a tape as shown in FIGS. 2, 3 and 10 and where ultra precision in measurement is required, it is essential that the axis of the tape to the axis of movement of the worktable be precisely established and maintained to avoid any side slippage of the tape on the precision roller 62. This precise alignment is not always possible and, where possible, is often very difficult to achieve and maintain. Instead of a precision alignment of the whole tape, a precision alignment of a portion of the tape passing through the transducer housing is provided by precision guide rollers mounted in pairs in said transducer housing. These rollers 290 are sized and positioned so that the edges of the tape are engaged and guided so that during the passage through the transducer housing and around the precision gage roller 62 the tape has the desired precise alignment with the roller. As there is only one extent of tape movable through the transducer housing there are provided only four rollers 290 arranged as oppositely spaced pairs with each pair of rollers preferably adjacent the inner termination of the wipers. As thus arranged, the inner extent of the precisely guided tape extends nearly the length of the internal extent of the transducer housing. Rollers 290, which may be precision miniature ball bearings, are indicated in both FIGS. 4 and 10. When rollers 290 are employed that portion of tape outside the transducer housing need be aligned only within reasonably established tolerances by mounting the longitudinal housing with reasonable care so that the tape is not laterally stretched.

The lead screw shown in contemplated as having a "fast" lead such as two, three, four or five threads per inch. It is only necessary, however, that the thread have a sufficient slope or lead so that the lead screw will freely rotate when the worktable is moved.

As noted above it is contemplated that a linear measuring system will be installed on the machine tool for the longitudinal and transverse ($x$ and $y$) measurements of the movement of the worktable. This may include a tape system such as that in FIGS. 2, 3 and 10 and a lead screw system as in FIGS. 13 and 15. It may also include two tape systems for the worktable movement and another system either tape or screw for measuring the downward travel ($z$ movement) of the spindle. The linear measurement of any or all of the x, y and z movements may be reported by any of the systems above-described with the systems arranged in any desired combination. A readout is provided for each linear movement measured and an error compensation circuit may be provided for each.

In addition to providing a precision measuring means for ascertaining the movement of worktables of machine tools it is also to be noted that the above-described precision indicator assemblies may be used in precision measuring applications. For example, the unit of FIGS. 3, 10, 13 or 15 may be used in construction of a height indicator. Either the tape and housing of FIGS. 3 and 10 on the encoder may be made movable. In the manner of height verniers which rely on a scale the present invention may be adapted co provide an accurate height reading after mounting on a precision base and column. If desired, the screw of FIG. 13 may be used and be rotated to move the encoder housing 215 while the interruption disc 76 is rotated to provide the desired pulse signals in accordance with the movement of the housing.

For the purpose of broad definitions, the linear measuring member may be the tape 50 of FIGS. 2 and 3 and 150 of FIG. 10. The screws 204 of FIG. 13 and screw 240 of FIG. 15 also are contemplated as being a linear measuring member as their relative movement with a precision nut is measured to determine the precise travel of the worktable, etc. The interrupter disc and the means of rotating this disc and the reading of this rotation by a photosensor are broadly defined as the encoder member of the position indicator.

Terms such as "left," "right," "up," "down," "bottom," "top," "front," "back," "in," "out" and the like are applicable to the embodiments shown and described in conjunction with the drawings. These terms are merely for the purposes of description and do not necessarily apply to the position in which the electro-optical digital position indicator may be constructed or used.

While a particular embodiment of the indicator and three alternate embodiments have been shown and described it is to be understood the invention is not limited thereto since modifications may be made within the scope of the accompanying claims and protection is sought to the broadest extent the prior art allows.

What is claimed is:

1. An electro-optical digital position indicator for sue with a machine tool having a cutting tool in association therewith, a precision measuring instrument having a sensing finger and like apparatus, said indicator adapted to precisely read the lineal distance of travel, said indicator including: (a) a longitudinal housing of a selected length which is greater than the extent of linear distance to be measured, said housing being secured to the worktable and moved therewith when the worktable is moved; (b) a linear measuring member having a precise configuration along its measuring length, said member carried near the ends of and supported by said longitudinal housing; (c) means for retaining said measuring member in a secured and protected condition within and by the housing and in a precise alignment with the plane of movement and supporting the measuring member in a mounted condition so that said member is of greater length than the distance maximum to be measured; (d) an encoder including an interrupter disc carried in a transducer housing; (e) means for locally engaging the linear measuring member with said means tranversing the measuring member over an extent as great as and corresponding to the established linear measurement to be made so that when the encoder and linear measuring members are moved relative to each other by power means associated with the apparatus on which they are carried a linear motion is translated to a precise rotative motion which is imparted to said interrupter disc for only measuring purposes, said disc having a precise array of radially oriented lines, the local engagement of the measuring member occurring substantially in a plane coincident with the work axis of the cutting tool, engaging finger and the like, and with the components providing the means for locally engaging the linear member and said linear member arranged so as to prevent undue wear, strain, distortion and the like of said components and when so arranged these components provide no member of the power means causing movement of the worktable work head and the like; (f) a light source and a photosensor carried by and as a part of said encoder, the photosensor adapted to receive a narrow beam of light from said source with said beam and photosensor arranged so that the lines of the interrupter disc interrupt the beam, said interruption as read by the photosensor being converted to electrical pulse signals, and (g) a digital counter and readout adapted to receive said electrical signals and convert said pulse signals into an indicia display corresponding to the linear movement.

2. An electro-optical digital position indicator as in claim 1 in which the linear measuring member is a tape of relative thinness, said tape having one end fixedly attached to one end of the longitudinal housing and the other end retained by a movable bracket actuated by a constant tension spring so as to bring the tape to a determined tension and in which the encoder has a precision gage roller in peripheral engagement with said tensioned tape so as to be positively rotated by the passage of the tape by the gage roller, said interrupter disc being rotated by the gage roller as the gage roller is driven by the passage of the tape.

3. An electro-optical digital position indicator as in claim 2 in which there is provided means for releasably clamping the movable bracket to prevent movement thereof during and while the indicator is being used for the measuring linear movement.

4. An electro-optical digital position indicator as in claim 2 in which there is provided a solenoid actuated clamp adapted to clamp the tape at a position adjacent the bracket actuated by the constant tension spring, said clamp preferably clamping the tape at said determined tension during the time the indicator is being used to measure the linear movement.

5. An electro-optical digital position indicator as in claim 3 in which the interrupter disc is carried on the shaft also carrying the precision gage roller and the lines on the interrupter disc are disposed to cut the beam of light as it is fed to and through the interrupter disc to the photosensor.

6. An electro-optical digital position indicator as in claim 4 in which the interrupter disc is carried on the shaft also carrying the precision gage roller and the lines on the interrupter disc are disposed to cut the beam of light as it is fed to and through the interrupter disc to the photosensor.

7. An electro-optical digital position indicator as in claim 3 in which the encoder is carried in a housing secured to a fixed portion of a machine tool and the like, and in which there is provided a protecting support bar which extends inside of and between the ends of the housing, said bar being in a parallel relationship to the tensioned tape.

8. An electro-optical digital position indicator as in claim 4 in which the encoder is carried in a housing secured to a fixed portion of a machine tool and the like, and in which there is provided a protecting support bar which extends inside of and between the ends of the housing, said bar being in a parallel relationship to the tensioned tape.

9. An electro-optical digital position indicator as in claim 1 in which the linear measuring system is a tape of relative thinness adapted to be brought into driving contact with a gage roller whose diameter is less than an inch, said tape having both ends secured to the support for the encoder, the tape being maintained in the desired lineal arrangement by a pair of rollers supported at opposite ends of the longitudinal housing and around which the tape is fed to permit the tape to be moved in response of relative movement of the longitudinal housing and the encoder, one of said rollers being fixedly mounted to said housing and the other roller carried by a movable bracket actuated by a constant tension spring so as to bring the tape to a determined tension, and in which the encoder has a precision gage roller in peripheral engagement with said tensioned tape so as to be positively rotated by the passage of the tape by the gage roller, said interrupter disc carried by the encoder being rotated by the gage roller as said gage roller is driven by the passage of the tape, said tape as thus arranged traveling at twice the rate and distance of the travel of the encoder in relation to the housing carrying the tape.

10. An electro-optical digital position indicator as in claim 9 in which there is provided means for releasably clamping the movable bracket to prevent movement thereof during and while the indicator is being used for linear movement.

11. An electro-optical digital position indicator as in claim 10 in which the interrupter disc is carried on the same shaft also carrying the precision gage roller and with the lines of the interrupter disc disposed to cut the beam the light as it is fed to and through said disc to the photosensor.

12. An electro-optical digital position indicator as in claim 11 in which the longitudinal housing is the movable member and the encoder is the fixed member, said longitudinal housing carrying means for enclosing those portions of the tape extending between the ends of the housing and the encoder, said means for enclosing being adapted to accommodate the passage of the encoder along the tape.

13. An electro-optical digital position indicator as in claim 12 in which the means for enclosing the tape portions are a pair of bellows extending from retaining means provided on the encoder to retaining means provided at the ends of the longitudinal housing.

14. An electro-optical digital position indicator as in claim 12 in which the means for enclosing the tape portions include a support bracket for the encoder and a bracket extending from outside the longitudinal housing into the interior of said housing, this longitudinal housing further having a slot along at least a substantial portion of its length and a pair of resilient seal strips retained on said housing, the seal strips being bent so that their mating edges form an apex which is spread by and only where the support bracket passes trough the apex of the seal strips.

15. An electro-optical digital position indicator as in claim 14 in which the seal strips are of plastic and in which the support bracket has a shank portion contoured so as to provide tapered end portions, each tapered portion providing a wedge to smoothly urge the seal strips apart and also permitting a smoothly guided return of the parted strips to a sealing condition.

16. An electro-optical digital position indicator as in claim 1 in which the linear measuring member is a lead screw having a precision thread, said screw being rotatably mounted in bearings carried by said longitudinal housing and rotation of the screw is induced by a precision nut fixedly carried by a support, the rotation of the screw in and by relative movement with the nut being only for said measuring purposes, said interrupter disc being carried on an extended portion of the lead screw so as to be rotated with the screw during relative lineal motion of the screw and nut.

17. An electro-optical digital position indicator as in claim 16 in which the longitudinal housing is the moved member and the supported nut is the fixed member during the relative lineal motion of one to the other.

18. An electro-optical digital position indicator as in claim 16 in which the lead screw is formed with a "fast" pitch of not more than six threads per inch.

19. An electro-optical digital position indicator as in claim 1 in which the linear measuring member is a lead screw fixedly mounted in said longitudinal housing and in which there is a precision nut carried on said screw, said nut being rotatably mounted in bearings carried by a support, the rotation of the nut in and by relative movement with the screw being only for said measuring purposes, said interrupter disc being carried by and on a portion of the nut so as to be rotated with the nut during relative lineal motion of the screw and nut.

20. An electro-optical digital position indicator as in claim 19 in which the longitudinal housing is the moved member and the supported nut is the fixed member during the relative lineal motion of one to the other.

21. An electro-optical digital position indicator as in claim 19 in which the lead screw is formed with a "fast" pitch of not more than six threads per inch.

22. An electro-optical digital position indicator as in claim 1 in which the linear measuring member is a metal tape having a linear coefficient of expansion substantially that of the table for which it is used to measure the travel, said tape being less than five-thousandths of an inch in thickness, and in which the encoder includes a transducer housing in which is rotatably carried a precision gage roller and a pair of idler rollers, the idler rollers disposed to receive the tape and retain it in a guided alignment while the precision gage roller displaces the tape from its aligned condition and the tape is brought into peripheral engagement with the tape so as to engage the tape for not less than substantially one-half of its circumference.

23. An electro-optical digital position indication as in claim 22 in which guide rollers are arranged as spaced pairs mounted in the transducer housing, each pair precisely spaced and aligned so as to engage the edges of the tape and maintain said tape in a precise alignment through the transducer housing and in a precise path to and around the precision gage roller.

24. An electro-optical digital position indicator as in claim 22 in which there is provided a constant tension spring adapted to actuate a movable bracket so as to bring the mounted tape to a determined tension and there is provided means for clamping the bracket during the operation of the indicator.

25. An electro-optical digital position indicator as in claim 24 in which there is provided wipers carried in the transducer housing, said wipers disposed to clean the tape prior to its passing over the idler and precision gage roller.

26. An electro-optical digital position indicator as in claim 25 in which the pairs of guide rollers are positioned adjacent to and inside the wipers carried by the transducer housing.

27. An electro-optical digital position indicator as in claim 1 in which there is provided a slit disc in alignment with the light source and the photosensor, said slit disc providing a 90° phase shift of light pulses developed by the rotation of the interrupter disc.

28. An electro-optical digital position indicator as in claim 27 in which the light source, the slit disc and photosensor are carried in a light tight housing having a slot opening into which the interrupter disc extends into the light beam, said housing adapted to align the axis of the light beam with the optical axis of the photosensors.

29. An electro-optical digital position indicator as in claim 27 in which the interrupter disc has at least 500 radial line pairs, said disc being of substantially transparent material except for the applied lines.

* * * * *